(12) United States Patent
Anantharaman et al.

(10) Patent No.: US 6,596,332 B1
(45) Date of Patent: *Jul. 22, 2003

(54) GELATINIZED CEREAL PRODUCT CONTAINING OLIGOSACCHARIDE

(75) Inventors: Helen Gillian Anantharaman, Bridgewater, CT (US); Olivier Ballevre, Lausanne (CH); Florence Rochat, Montreux (CH)

(73) Assignee: Nestec S.A., Vevey (CH)

( * ) Notice: Subject to any disclaimer, the term of this patent is extended or adjusted under 35 U.S.C. 154(b) by 338 days.

This patent is subject to a terminal disclaimer.

(21) Appl. No.: 09/684,135

(22) Filed: Oct. 10, 2000

Related U.S. Application Data

(63) Continuation of application No. 09/375,105, filed on Aug. 16, 1999, now Pat. No. 6,197,361, which is a continuation of application No. 08/980,714, filed on Dec. 1, 1997, now Pat. No. 5,952,033.

(30) Foreign Application Priority Data

Dec. 24, 1996 (EP) ............................................... 96203705
Oct. 7, 1997 (EP) ............................................... 97203112

(51) Int. Cl.$^7$ ............................... A23L 2/40; A23K 1/14
(52) U.S. Cl. ....................... 426/560; 426/618; 426/623; 426/635
(58) Field of Search ................................. 426/560, 618, 426/623, 449, 805, 635, 2

(56) References Cited

U.S. PATENT DOCUMENTS

| | | |
|---|---|---|
| 4,752,139 A | 6/1988 | Hauck |
| 4,778,680 A * | 10/1988 | Hidaka et al. ................. 426/2 |
| 4,781,939 A | 11/1988 | Martin et al. |
| 4,865,852 A | 9/1989 | Tamatani et al. |
| 4,871,574 A | 10/1989 | Yamazaki et al. |
| 5,132,137 A | 7/1992 | Reimann et al. |
| 5,258,195 A | 11/1993 | Lohan |
| 5,527,556 A | 6/1996 | Frippiat et al. |
| 5,756,088 A | 5/1998 | Matsuura et al. |
| 5,776,524 A | 7/1998 | Reinhart |
| 5,925,190 A * | 7/1999 | Richards ....................... 127/34 |
| 5,952,033 A * | 9/1999 | Anantharaman et al. .... 426/615 |
| 5,958,898 A * | 9/1999 | Hayek et al. .................. 514/54 |
| 5,968,569 A | 10/1999 | Cavadini et al. |
| 5,972,415 A * | 10/1999 | Brassart et al. ............. 426/634 |
| 6,197,361 B1 * | 3/2001 | Anantharaman et al. .... 426/560 |
| 6,391,375 B1 * | 5/2002 | Fone ........................... 426/635 |

FOREIGN PATENT DOCUMENTS

| | | |
|---|---|---|
| CH | 570 117 | 12/1975 |
| DE | 3815950 A | 11/1989 |
| DE | 3915009 A | 11/1989 |
| EP | 0609056 A2 | 8/1994 |
| EP | 0627172 A1 | 12/1994 |
| EP | 0674842 A1 | 10/1995 |
| GB | 2 291 580 | 1/1996 |
| JP | 63309147 | 12/1988 |
| RU | 2018313 | 8/1994 |
| WO | 94/27617 | 12/1994 |
| WO | 96/39444 | 12/1996 |
| WO | 98/52578 | 11/1998 |
| WO | 99/22604 | 5/1999 |

OTHER PUBLICATIONS

Gibson et al.; "Bifidogenic Properties of Different Types of Fructo–Oligosaccharides"; Food Microbiology; vol. 11, 1994, pp. 491–498.

Williard, M.D., et al.; "Effects of Dietary Supplementation of Fructo–Oligosacchardies on Small Intestinal Bacterial Overgrowth in Dogs"; Am. J. Vet. Res.; vol. 55; No. 5; May 1994; pp. 654–659.

* cited by examiner

*Primary Examiner*—Nina Bhat
(74) *Attorney, Agent, or Firm*—Bell, Boyd & Lloyd LLC

(57) ABSTRACT

A gelatinized cereal product which contains a plant material which is a source of inulin: for example chicory. Sufficient of the plant material is included to provide at least about 0.25% by weight of inulin on a dry basis. The cereal product may be used as a pet food or breakfast cereal.

76 Claims, No Drawings

GELATINIZED CEREAL PRODUCT CONTAINING OLIGOSACCHARIDE

This application is a continuation of U.S. patent application Ser. No. 09/375,105, filed on Aug. 16, 1999, now U.S. Pat. No. 6,197,361, which is a continuation of U.S. patent application Ser. No. 08/980,714, filed on Dec. 1, 1997, now U.S. Pat. No. 5,952,033.

FIELD OF THE INVENTION

This invention relates to a gelatinized cereal product which contains oligosaccharide in the form of inulin; especially in the form of natural sources of inulin such as chicory. In use, the cereal product has a beneficial effect in the gastro-intestinal tract of the consumer and hence upon the consumer as a whole. The invention also relates to a process of producing the cereal product and to methods of promoting beneficial effects in the gastro-intestinal tracts of humans and animals. The cereal product is particularly suitable for use as a pet food.

BACKGROUND OF THE INVENTION

Oligosaccharides such as inulin and various fructo-oligosaccharides are reported to promote the growth of bifido- and lacto-bacteria in the gastro-intestinal tract at the expense of pathogens such as *Clostridium perfringens*. For example, see Gibson et al. 1994; *Food Microbiology*, 11(6), 491–498. Although most reported experimentation has been carried out in vitro, there have been reports that these oligosaccharides have a similar effect in the gut of rats and humans. Further, promoting the growth of bifido- and lacto-bacteria through the use of oligosaccharides is reported to have various beneficial effects on animals and humans. These beneficial effects include the prevention or treatment of diarrhea, and increased growth; improved ability to breed, and enhanced health.

These beneficial effects have resulted in use of oligosaccharides, particularly fructo-oligosaccharides, in human foods and feeds for live stock. For example, International patent application WO 94/27617 discloses the use of a caramel which contains fructo-oligosaccharides in animal feed to enhance the health of live stock. However, reports of the use of inulin also exist. For example Japanese patent application 63-309147 discloses the use of a purified inulin in the feed for younger animals to prevent diarrhea after weaning and to increase body weight. Similarly. U.S. Pat. No. 4,865.852 discloses the use of inulin in the form of treated chicory as a feed for live stock.

Although the primary focus for oligosaccharides has been human foods and feeds for live stock, the use of fructo-oligosaccharides in a veterinary diet for pets has also been suggested (Willard et al: 1994. *Am. J. Vet. Res*,. 55. 654–659). Further, products containing fructo-oligosaccharides are on the market: for example the Eukanuba product (The IAMS Company).

For the products which contain inulin, the inulin is usually purified from plants which contain higher concentrations of inulin: such as chicory. Jerusalem artichoke, leek and asparagus. Otherwise, the plant material is treated in some form or another prior to use. A reason for the purification or treatment is that the plants themselves are reported to have bitter flavors which result in palatability problems: see for example U.S. Pat. No. 4,865,852. This is particularly the case with chicory where the bitter flavors are believed to be due to the concentrations of sesquiterpene lactones such as lactucin and lactucopicrin in chicory. Also, it is generally believed that more accurate control of the amounts added may be obtained with purified product. Various procedures for purifying the inulin or treating the plant material have been reported. Usually however they include the steps of chopping up the plant, extracting it, and hydrolyzing it with acids or enzymes. The hydrolysate is then collected and condensed to obtain the inulin. For example, Japanese patent application 63-309147 discloses grinding chicory tubers, partially hydrolyzing them with acids, and then drying the hydrolysate with or without neutralization.

A Unfortunately, fructo-oligosaccharides and purified inulin greatly add to the cost of the products. Consequently for pet foods, their use has been confined to specialty veterinary products such as the Eukanuba product and to pet treats. Similarly, for human foods, their use has been confined to specialty products.

Therefore there is a need for a cereal product which has the properties of food which contains fructo-oligosaccharides and purified inulin, which is palatable to humans and animals, and which may be inexpensively produced.

SUMMARY OF THE INVENTION

Accordingly, in one aspect, this invention provides a cereal product which comprises a gelatinized starch matrix which contains an amount of a plant material which is a source of inulin, sufficient to provide at least about 0.25% by weight inulin, on a dry matter basis.

It has been surprisingly found that adding a natural plant material which is a source of inulin to the usual ingredients of gelatinized cereal products and then gelatinizing the ingredients does not adversely affect the palatability of the food to humans and pets. This is despite the presence of sesquiterpene lactones such as lactucin and lactucopicrin in the plant materials. The gelatinisation of the ingredients of the cereal products surprisingly appears to remove or destroy these compounds. Also, trials indicate that dogs may find the cooked food even more palatable than commercially available foods. Given that these plant materials were thought to be highly unpalatable to animals, this result is extremely surprising. Cats find the cooked food at least as palatable as commercially available foods. It is also surprisingly found that gelatinizing of the ingredients does not result in any significant degradation of the shorter chain oligosaccharides of inulin. Therefore, it is believed that the gelatinized cereal product retains the properties of unprocessed inulin.

The plant material preferably comprises an inulin-rich plant, material such as chicory or Jerusalem artichoke, or both: especially chicory. The gelatinized cereal product preferably contains sufficient of the plant material such that it comprises at least 0.5% by weight of inulin on a dry matter basis. The maximum amount is inulin is preferably about 10% by weight on a dry matter basis. The gelatinized cereal product preferably includes at least about 0.01% by weight of kestose; 0.01% by weight of nystose and 0.01% by weight of fructosyl-nystose. More preferably kestose, nystose and fructosyl-nytose make up at least about 0.1% by weight of the celatinized cereal product: for example the gelatinized cereal product may include at least about 0.04% by weight of kestose; 0.04% by weight of nystose and 0.040% by weight of fructosyl-nystose.

Preferably, the gelatinized matrix further includes protein. The gelatinized cereal product preferably comprises an extrusion cooked product. The extrusion cooked product may be in dried pellet form, dried expanded form, or flaked form.

In a further aspect, this invention provides a process of preparing a gelatinized cereal product which contains at least about 0.25% by weight of inulin on a dry matter basis, the process comprising gelatinizing a starch source, a protein source, and a plant material which is a source of inulin to form a gelatinized starch and protein matrix which contains the inulin.

Preferably the starch source, protein source, and plant material are extrusion cooked and then extruded. Further, the extrudate may be dried.

In another aspect, this invention provides a method of increasing the digestibility of a cereal product comprising incorporating a plant material which is a source of inulin into the cereal product.

In a yet further aspect, this invention provides a method of decreasing fecal volume of a pet, the method comprising feeling the pet a gelatinized cereal product which contains an amount of a plant material which is a source of inulin, sufficient to provide at least about 0.25% by weight inulin, on a dry matter basis.

DETAILED DESCRIPTION OF THE PREFERRED EMBODIMENTS

Embodiments of the invention are nose described, by way of example only.

The invention provides a gelatinized cereal product which contains an amount of a plant material, which is a source of inulin, sufficient to provide at least about 0.25% by weight inulin, on a dry matter basis. The plant material used may be any suitable source of inulin: for example chicory, Jerusalem artichoke, leek, onion, yacon, asparagus which contains high levels or inulin, and mixtures of these plants. However inulin rich plant materials such as chicory and Jerusalem artichoke are preferred: especially chicory. These plant materials usually comprise at least about 50% by weight of inulin. For ease of handling, the plant material is preferably in a dried, committed form. For simplicity of description, the processes described below are described with reference to the use of dried, comminuted chicory. However it is to be understood that any suitable plant material may be used in any suitable form.

The remaining ingredients included in the gelatinized cereal product may be any suitable ingredients commonly used in gelatinized cereal products. Usually these ingredients include a starch source and a protein source. Suitable starch sources are, for example, grains such as corn, rice, wheat, beets, barley, oats, soy, and mixtures of these. Suitable protein sources may be selected from any suitable animal or vegetable protein source; for example meat meal, bone meal, fish meal, soy protein concentrates, milk proteins, gluten, and the like. The choice of the starch and protein sources will be largely determined by the nutritional needs of the animal or human, palatability considerations, and the type of cereal product produced. Various other ingredients, for example, sugar, salt, spices, seasonings, vitamins, minerals, flavoring agents, fats and the like may also be incorporated into the elatinized cereal product as desired.

The gelatinized cereal product may be produced in many different ways as desired. However, for a dried cereal product, an especially suitable way of producing the product is extrusion cooking. This may be done as is well known in the art. For example, in one suitable process, a feed mixture is fed into a preconditioner. The Feed mixture is primarily made up of a starch source, a protein source, and the chicory. Preferably the chicory comprises at least about 1% by weight of the feed material: more preferably at least about 2% by weight. The maximum of chicory is preferably about 20% by weight: especially about 10% by weight.

In the preconditioner, water or steam, or both, is mixed into the feed mixture. Sufficient water or steam is mixed into the feed mixture to moisten the feed mixture. If desired, the temperature of the feed mixture may be raised in the preconditioner to about 60° C. to about 90° C. by weight. A suitable preconditioner is described in U.S. Pat. No. 4,752,139. Plainly, it is not necessary to use a preconditioner.

The moistened feed leaving the preconditioner is then fed into an extruder. The extruder ma be any suitable single or twin screw, cooking-extruder. Suitable extruders may be obtained from Wenger Manufacturing Inc. Clextral S A. B ühler AG. and the like. During passage through the extruder, the moistened feed passes through a cooking zone, in which it is subjected to mechanical shear and is heated: for example up to a maximum temperature of up to about 150° C. and a forming zone. The gauge pressure in the forming zone is about 300 kPa to about 10 MPa as desired. If desired, water or steam, or both, may be introduced into the cooking zone. During passage through the extruder, the starch source of the moistened feed is gelatinized to provide a gelatinized matrix structure primarily of starch, protein and chicory.

The gelatinized matrix leaving the extruder is forced through a suitable die: for example a die as described in European patent application 0665051; the disclosure of which is incorporated by reference. A shaped extrudate, which has a cross-sectional shape corresponding to that of the orifice of the die, leaves the die. Depending upon the conditions in the extruder and the starch source used, the shaped extrudate expands to a greater or lesser extent. The shaped extrudate is then cut into pieces using blades. The individual pieces are then dried and, if desired, coated with protective or flavoring agents, or both. After cooling, the pieces may be packed into suitable packages. Alternatively, the individual pieces may be formed into flakes and then dried.

Depending upon the ingredients used, the gelatinized cereal product may be in the form of dried kibbles suitable for use as pet foods, expanded pieces suitable for use in breakfast cereals, flakes suitable for use in breakfast cereals, and the like.

It is also possible to produce a dried cereal product by mixing together water and the ingredients of cereal product: for example in a preconditioner. The wet mixture may then be shaped into a desired shape: for example using shaping rollers. The shaped mixture may then be baked in an oven: for example at about 220° C. to about 280° C. for about 10 minutes to about 1 hour. The dried cereal product has the appearance of a baked biscuit.

If it is desired to produce a simulated meat product which may be used in canned pet foods, the processes described in U.S. Pat. Nos. 4,781,939 and 5,132,137 may be used. In these processes, a protein source, especially a meat material, is emulsified. The meat material may be any suitable source of animal protein: for example the muscular or skeletal meat of mammals, poultry, and fish or meat by-products such as hearts, liver, kidneys, tongue and the like, or meat meals. Vegetable protein sources may also be included if desired. The exact composition may be selected according to cost and the desired flavor. The emulsification may be carried out in any suitable equipment.

The dried chicory is added to the emulsion. Also, if desired or needed, additional protein may be added to the emulsion. The additional protein may be any protein source as mentioned above. The exact choice will depend upon availability, cost and palatability. Usually about 5% to about 35% of the further protein source is used.

If desired or required, fats may also be added to the emulsion. Usually the amount of fat in the emulsion must be controlled to facilitate processing and to obtain an acceptable product. However, the meat material may well contain the desired amount of fats and hence adjustment may not be necessary. Typically at this stage the emulsion contains a maximum fat level of about 25% by weight. Conveniently, the amount of fat in the emulsion is in the range of about 5% to 15% by weight; more preferably about 7% to about 12% by weight. The mass ratio protein to fat in the emulsion is preferably about 1:1 to about 7:1. If added, the fats may be any suitable animal fats; for example tallow, or may be vegetable fats.

Additional ingredients such as sugars, salts, spices, seasonings, flavoring agents, minerals, and the like may also be added to the emulsion. The amount of additional ingredients used is preferably such that they make up about 1% to about 5% by weight of the gelatinized cereal product.

Water may also be added to provide from about 45% to 80% by weight moisture in the emulsion. It sufficient moisture is present in the meat material, water need not be added.

Once mixed, the emulsion is preferably fed through a vacuum stuffer, or similar de-aeration apparatus, to de-aerate the emulsion. This removes air which may otherwise cause disruption of the formulated emulsion product and reduce its neat-like appearance.

The emulsion is then fed to an emulsion mill which subjects the emulsion to rapid mechanical heating and shearing. Any suitable emulsion mill may be used, for example the emulsion mill disclosed in U.S. Pat. No. 5,132,137. Other suitable emulsion mills are commercially available under the trade name of Triognal and may be obtained from Siefer Machinenfabrik GmbH & Co. KG, Bahnhofstrasse 114, Postfach 101008, Velbert 1, Germany.

The temperature of the emulsion is raised to the desired coagulation temperature in the emulsion mill in a few seconds. For example, the temperature may be raised to from about 100° C. to about 120° C. Alternatively, the temperature may be raised to in the range of about 45° C. to about 75° C. as described in U.S. Pat. No. 5,132,137. Usually the mechanical energy generated in the emulsion mill will be sufficient to heat the emulsion to the desired temperature but this may be supplemented by the injection of superheated steam.

The heated emulsion leaving the emulsion mill is then transferred to a holding tube. In the holding tube, the heated emulsion coagulates while moving slowly along the holding tube. The residence time of the heated emulsion in the holding tube is sufficient for the emulsion to have coagulated into a firm emulsion product upon reaching the exit of the holding tube.

The firm emulsion product leaving the holding tube is then transferred to a cutter where it is cut into chunks of size suitable for use in a pet food. The chunks have the appearance and texture of meat. The chunks may be subjected to flaking if desired. The chunks may also be formulated into a chunk-in-gravy type of product.

Other procedures for producing chunks are known and may be used; for example extruding a feed mixture, cooking the feed mixture in a steam oven, and the cutting the cooked extrudate into chunks.

If it is desired to produce a canned pet food in the form of a meat loaf, a meat batter may be prepared by emulsifying a suitable meat material to produce a meat emulsion. The meat material may be any suitable meat source, for example as described above. Suitable gelling agents, for example gums such as kappa-carrageenan, locust bean Lum, Liar gum and xanthan gum man be added to the meat emulsion. Usual no more than about 2% by weight of gum is needed. The dried chicory is then added to the meat emulsion.

Additional ingredients such as sugars, salts, spices, seasonings, flavoring agents, minerals, and the like may also be added to the meat emulsion. The amount of additional ingredients used is preferably such that they make up about 0.25% to about 5% by weight of the meat batter.

Water may also be added to the meat emulsion to provide from about 70% to about 85% by weight. If sufficient moisture is present in the meat material, water need not be added.

The meat emulsion is then heated to a temperature above about 65° C. in a mixer-cooker. Steam may be injected into the meat batter if desired. The heated meat emulsion is then again emulsified to provide a loaf batter and the loaf batter maintained at a temperature above about 60° C. until fillinq into cans.

It will be appreciated that the gelatinized cereal product may be produced by any suitable process and not only those described above. Other types of oligosaccharides may also be included in the gelatinized cereal product; for example fructo oligosaccharide and soy oligosaccharide. The soy oligosaccharides may be added in the form of soy meal or other suitable soy source.

The cereal products may be in any suitable form; for example dried, semi-wet and wet. However, the matrix making up the cereal product must be gelatinized in order to remove or destroy the sesquiterpene compounds present in the inulin-containing plant material.

Specific examples are now described for further illustration.

EXAMPLE 1

A feed mixture is made up of about 58% by weight corn, about 5.5% by weight of corn gluten, about 22% by weight of chicken and fish meal, dried chicory and salts, vitamins and minerals making up the remainder. Two levels of chicory are used; about 2.5% and about 5%. Also, two commercial types of chicory are used; Leroux standard blend and Leroux Rubis variety. Both types are commercially available on the French market from the Leroux company.

The feed mixture is fed into a preconditioner and moistened. The moistened feed leaving the preconditioner is then fed into an extruder-cooker and gelatinized. The gelatinized matrix leaving the extruder is force through a die and extruded. The extrudate leaving the die head is cut into pieces suitable for feeding to cats, dried, and cooled to pellets.

The pellets are fed to a panel of 80 cats. For comparison, the cats may choose between the pellets with chicory and control pellets which are identical except that they do not contain chicory. The amount that each cat eats of each type of pellet is monitored. The results are as follows:

| Example No | Chicory Type | Chicory level % | Percentage consuming pellets containing chicory |
| --- | --- | --- | --- |
| 1A | Standard | 2.5 | 42 |
| 1B | Standard | 5.0 | 52 |
| 1C | Rubis | 2.5 | 46 |
| 1D | Rubis | 5.0 | 52 |

The results indicate that the pellets with chicory have substantially the same palatability as those without. However, even more surprisingly, as the chicory content increases, the palatability appears to increase.

The gut flora of the cats is analyzed and it is determined that bifidobacteria counts have increased while *C. perfringeus* counts have decreased. Further, fecal pH and odors are found to have decreased. Energy and mineral digestibility have increased leading to a decrease in fecal volume.

The pellets are crushed and extracted with methanol by boiling under reflux for 1 hour. The extract is twice partitioned between water and chloroform and santonin is added. The chloroform phase is separated, dried and evaporated. The residue is dissolved in a mixture of methanol and chloroform and analyzed using HPLC for free sesquiterpene lactones. The water phase is run through a column and glycosylated compounds eluted from the column using methanol. The eluant is evaporated, dissolved in water and treated with cellulase at 40° C. for 2 hours. Santonin is added to the hydrolysate and the mixture extracted with ethyl acetate. The mixture is then analyzed using HPLC for bound sesquiterpene lactones.

No sesquiterpene lactones are detected. Similar analysis of the chicory starting ingredient reveals between 130 to 350 ppm free sesquiterpene lactones and between 380 to 680 ppm bound sesquiterpene lactones.

EXAMPLE 2

A trial is conducted using 30 dog. The control food is the Friskies Menu Energy product, which is dried dog food available on the market. Two test foods are prepared: they correspond to the Friskies Menu Energy product except that they include 5% by weight of chicory. One test food contains the Leroux standard blend chicory and the other contains the Leroux Rubis chicory.

The foods are fed to the panel of 30 dogs. The amount that each dog eats of each type of food is monitored. The trial is then repeated. The results are as follows:

| Example No | Chicory Type | Chicory level % | Percentage consuming pellets containing chicory |
| --- | --- | --- | --- |
| 2A | Standard | 5.0 | 62 |
| 2B | | | 69 |
| 2C | Rubis | 5.0 | 80 |
| 2D | | | 89 |

The results indicate that the foods with chicory have improved palatability as compared to the control. In the case of the standard chicory, the improvement is pronounced.

The gut flora of the dogs is analyzed and it is determined that bifidobacteria counts have increased while *C. perfringens* counts have decreased. Further, fecal pH and odors are found to have decreased. Energy and mineral digestibility have increased leading to a decrease in fecal volume.

EXAMPLE 3

The amount of kestose, nystose and fructosyl-nystose in the pellets of example 1 is measured.

| Oligo-saccharide | Example 1A | Example 1B | Example 1C | Example 1D |
| --- | --- | --- | --- | --- |
| kestose | 0.04 | 0.08 | 0.04 | 0.07 |
| nystose | 0.04 | 0.08 | 0.05 | 0.08 |
| fructosyl-nystose | 0.04 | 0.09 | 0.05 | 0.09 |
| Total | 0.12 | 0.25 | 0.14 | 0.24 |

The amount of total inulin, kestose, nystose and fructosyl-nystose in the two different types of chicory used in example 1 is measured. On the basis of this determination and the amount of chicory added, a theoretical amount of kestose, nystose and fructosyl-nystose is determined for each pellet. The theoretical, combined amounts of kestose, nystose and fructosyl-nystose in the pellets are then compared to the measured, combined amounts. The theoretical amounts and the measured amounts are comparable indicating that little or no degradation of the kestose, nystose and fructosyl-nystose has taken place during extrusion cooking.

EXAMPLE 4

A feed mixture is made up of rice flour, wheat flour, sugar, malt, vegetable fats, salt and about 5% by weight of chicory. The feed mixture is fed into a preconditioner and moistened. The moistened feed leaving the preconditioner is then fed into an extruder and gelatinized. The temperature at the exit of the extruder is about 150° C. The pressure in the extruder reaches about 130 bar. The gelatinized matrix leaving the extruder is forced through a die and extruded. The extrudate expands upon leaving the die head and is cut into pieces of about 2 to 3 mm. The pieces are then dried to a moisture content of about 1% by weight. The pieces are in the form of a puffed breakfast cereal.

The pieces are tasted by a panel of consumers and are found to have a good taste; comparable to a puffed breakfast cereal produced without chicory.

EXAMPLE 5

A trial is conducted using 16 dogs. The control food is the Friskies Menu Vitality product, which is dried dog food available on the market. A test food is prepared which correspond to the Friskies Menu Vitality product except that it include 3% by weight of Leroux standard blend chicory.

Eight dogs are fed the control food and eight dogs are fed the test food. Feces samples are collected from each dog, heated for 2 hours at 30° C., and the compounds released trapped on a Tenax tube. The trapped compounds are desorbed on a gas chromatograph. The levels of dimethylsulfide, dimethyldisulfide, and dimethyltrisulfide are determined as follows:

| Food | Dimethylsulfide Area | Dimethyldisulfide Area | Dimethyltrisulfide Area |
| --- | --- | --- | --- |
| Control | 5731312 | 1084439 | 379164 |
| Test | 1719824 | 48824 | 43739 |

The results indicate that the feces of the dogs fed the test diet have much reduced amounts of those sulfur containing compounds which are believe to cause unpleasant odors.

The levels of short chain fatty acids in the feces are also determined by gas chromatograph as follows:

| Food | Acetate Area | Propionate Area | Butyrate Area | Total Area |
|---|---|---|---|---|
| Control | 120 | 66 | 20 | 207 |
| Test | 159 | 91 | 18 | 267 |

The results indicate that the dogs fed the test diet have higher levels of short chain fatty acids in the gut. Short chain fatty acids are important nutrients for gut cells, the liver and muscles. An increase in the content of short chain fatty acids in the gut may result in an improvement in the health of the animal or human.

We claim:

1. A pet food product comprising starch and chicory.

2. The pet food product of claim 1 wherein the chicory provides at least 0.25% by weight inulin, on a dry matter basis.

3. The pet food product of claim 1 wherein the chicory includes dried chicory.

4. The pet food product of claim 1 wherein the pet food is a dried pellet.

5. The pet food product of claim 1 comprising at least about 0.1% by weight of kestose, nystose and fructosyl-nystose.

6. A dry pet food comprising:
   a gelatinized starch matrix; and
   chicory.

7. The dry pet food of claim 6 wherein the chicory provides at least 0.25% by weight inulin, on a dry matter basis.

8. The dry pet food of claim 6 wherein the chicory includes dried chicory.

9. The dry pet food of claim 6 wherein the dry pet food is in pellet form.

10. A dried pet food comprising:
    a starch matrix; and
    an effective amount of a plant material that includes inulin to promote the growth of beneficial bacteria in the gastro-intestinal tract of an animal ingesting same.

11. The dry pet food of claim 10 wherein the plant material provides at least 0.25% by weight inulin, on a dry matter basis.

12. The dry pet food of claim 10 wherein the plant material includes chicory.

13. The dry pet food of claim 10 wherein the plant material includes dried chicory.

14. The dry pet food product of claim 10 wherein the pet food is in a pellet form.

15. A method for promoting the growth of beneficial bacteria in the gastro-intestinal tract of an animal comprising the step of administering a plant material that includes inulin in a sufficient amount to stimulate the growth of beneficial bacteria in the gastro-intestinal tract of the animal.

16. The method of claim 15 wherein the plant material provides at least 0.25% by weight inulin, on a dry matter basis.

17. The method of claim 15 wherein the plant material is in a dried pet food.

18. A method for promoting the growth of beneficial bacteria in the gastro-intestinal tract of an animal comprising the step of administering chicory that includes inulin in a sufficient amount to stimulate the growth of beneficial bacteria in the gastro-intestinal tract of the animal.

19. The method of claim 18 wherein the chicory provides at least 0.25% by weight inulin, on a dry matter basis.

20. The method of claim 18 wherein the chicory is in a dried pet food.

21. A pet food product comprising an effective amount of a plant material that includes inulin to promote the growth of beneficial bacteria in the gastrointestinal tract of an animal ingesting same.

22. The pet food product of claim 21 wherein the product is dry.

23. The pet food product of claim 21 wherein the plant material provides at least 0.25% by weight inulin on a dry weight basis.

24. The pet food product of claim 21 wherein the product is a canned pet food.

25. A pet food product comprising a protein source and a plant material that includes inulin in an amount sufficient to promote the growth of beneficial bacteria in the gastrointestinal tract of an animal ingesting same.

26. The pet food product of claim 25 wherein the protein is emulsified.

27. The pet food product of claim 25 wherein the product is in a meat loaf form.

28. The pet food product of claim 25 including a meat emulsion to which water has been added.

29. The pet food product of claim 28 wherein the moisture content of the emulsified protein is at least 45% by weight.

30. The pet food product of claim 25 wherein the product is a canned pet food.

31. A pet food product comprising a protein source and chicory, the chicory including inulin in an amount sufficient to promote the growth of beneficial bacteria in the gastrointestinal tract of an animal ingesting same.

32. The pet food product of claim 31 wherein the protein is emulsified.

33. The pet food product of claim 31 wherein the product is in a meat loaf form.

34. The pet food product of claim 31 including a meat emulsion to which water has been added.

35. The pet food product of claim 34 wherein the moisture content of the emulsified protein is at least 45% by weight.

36. The pet food product of claim 31 wherein the product is a canned pet food.

37. A product for a pet comprising chicory in an amount sufficient to provide a prebiotic effect in an animal ingesting the product.

38. The product of claim 37 wherein the product is in a meat loaf form.

39. The product of claim 37 wherein the product is a canned pet food.

40. The product of claim 37 wherein the product is in dried pellet form.

41. A pet food product comprising a carbohydrate source and a plant material that includes inulin in an amount sufficient to promote the growth of beneficial bacteria in the gastrointestinal tract of an animal ingesting same.

42. The pet food of claim 41 wherein the pet food is dry.

43. The pet food of claim 41 wherein the plant material provides at least 0.25% by weight inulin on a dry weight basis.

44. The pet food product of claim 41 wherein the product is a canned pet food.

45. A pet food product comprising a carbohydrate source and chicory that includes inulin in an amount sufficient to promote the growth of beneficial bacteria in the gastrointestinal tract of an animal ingesting same.

46. The pet food of claim 45 wherein the plant material provides at least 0.25% by weight inulin on a dry weight basis.

47. The pet food of claim 45 wherein the pet food is dry.

48. The pet food product of claim 45 wherein the product is a canned pet food.

49. A pet food product comprising at least 0.25% by weight inulin.

50. The pet food of claim 49 wherein the product is a canned pet food.

51. The pet food of claim 49 wherein the product is in a meat loaf form.

52. The pet food of claim 49 including protein that has been emulsified.

53. The pet food of claim 49 including a meat emulsion to which water has been added.

54. The pet food of claim 49 including a carbohydrate.

55. A pet food product comprising a sufficient amount of a plant material that, when ingested, provides a beneficial effect in the gastrointestinal tract of the pet ingesting the product.

56. The pet food of claim 55 wherein the beneficial effect is to increase the bifido bacteria count in a gut of the pet.

57. The pet food of claim 55 wherein the beneficial effect is to increase the level of short chain fatty acids in a gut of the pet.

58. The pet food of claim 55 wherein the beneficial effect is to reduce the sulfur content of feces generated by the pet.

59. The pet food of claim 55 wherein the pet food is in the form of a dried pellet.

60. The pet food of claim 55 wherein the pet food is a canned product.

61. The pet food of claim 55 wherein the pet food is in the form of a meat loaf product.

62. A method for manufacturing a pet food comprising the step of using a sufficient amount of a plant material that, when ingested by a pet, provides a beneficial effect in the gastrointestinal tract of the pet.

63. The method of claim 62 wherein the beneficial effect is to increase the bifido bacteria count in a gut of the pet.

64. The method of claim 62 wherein the beneficial effect is to increase the level of short chain fatty acids in a gut of the pet.

65. The method of claim 62 wherein the beneficial effect is to reduce the sulfur content of feces generated by the pet.

66. A method of providing a beneficial effect in the gastrointestinal tract of a pet comprising the step of providing a pet food that comprises a sufficient amount of a plant material that increases the bifido bacteria count in a gut of the pet ingesting the pet food.

67. A method of providing a beneficial effect in the gastrointestinal tract of a pet comprising the step of providing a pet food that comprises a sufficient amount of a plant material that increases the level of short chain fatty acids in a gut of the pet ingesting the pet food.

68. A method of providing a beneficial effect in the gastrointestinal tract of a pet comprising the step of providing a pet food that comprises a sufficient amount of a plant material that reduces the sulfur content of feces generated by the pet ingesting the pet food.

69. A pet food product comprising chicory in an amount ranging from about 1% to about 20% by weight of a feed material.

70. The pet food product of claim 69 wherein the pet food product is in a meat loaf form.

71. The pet food product of claim 69 wherein the pet food product is a canned pet food product.

72. The pet food product of claim 69 wherein the pet food product is in a dried pellet form.

73. A pet food product comprising chicory in an amount sufficient to reduce pet fecal odors and volume.

74. The pet food product of claim 73 wherein the pet food product is in a meat loaf form.

75. The pet food product of claim 73 wherein the pet food product is a canned pet food product.

76. The pet food product of claim 73 wherein the pet food product is in a dried pellet form.

* * * * *